April 10, 1934.  L. E. AUGUST  1,954,343
AUTOMATIC WELDING DEVICE AND METHOD
Filed Sept. 14, 1931
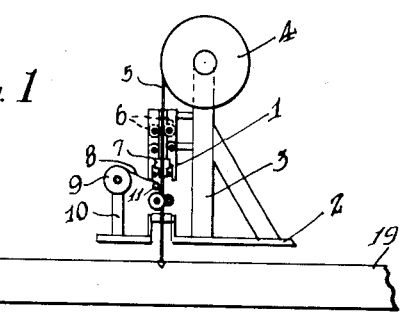
Fig. 1
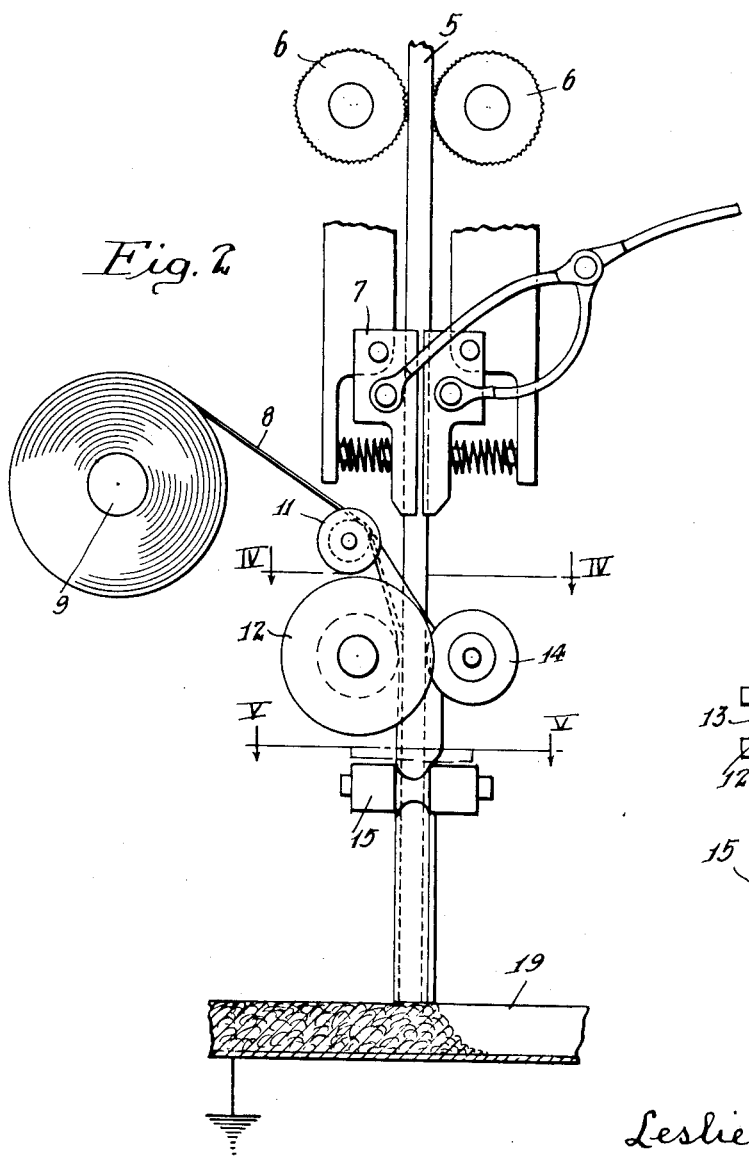
Fig. 2
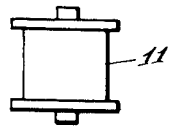
Fig. 3
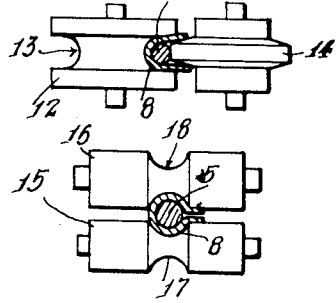
Fig. 4
Fig. 5
Inventor
Leslie E. August
By Lyon & Lyon
Attorneys Patented Apr. 10, 1934

1,954,343

UNITED STATES PATENT OFFICE 1,954,343

AUTOMATIC WELDING DEVICE AND METHOD

Leslie E. August, Los Angeles, Calif., assignor to Consolidated Steel Corporation, Los Angeles, Calif., a corporation of California Application September 14, 1931, Serial No. 562,611

4 Claims. (Cl. 219—8)

My invention relates to automatic welding devices and methods and has particular reference to a device for supplying flux to an electrode employed in an electric arc welding machine. In the art of electric arc welding, welding machines have been developed which are adapted to continuously feed a wire of electrode material toward the work which is to be welded at a rate of speed which is proportional to the welding conditions encountered on the welding job. The welding wire is usually supplied to the machine in the form of a continuous length of wire rolled upon a suitable spool or reel, so that a great length of electrode wire may be used in a continuous weld without the necessity of stopping the machine to replenish the supply of electrode material.

The electrode wire is usually connected to a source of electric current by means of a suitable clamp or slip through which the wire passes so that the contact between the wire and the slip constitutes the electric connection. Obviously, if the electrode wire is uncoated correct electric contact may be made in such manner, but it is frequently desirable or necessary to supply a flux to the electrode to assist in the correct welding of the articles worked on.

Various methods of supplying such flux have been attempted, such as surrounding the electrode wire with a coating of the flux desired to be employed. This method, however, is unsatisfactory because it requires the carrying in stock of a great number of different kinds of electrodes having different kinds of flux and, further, has the disadvantage of requiring that either the electrode must be provided in short lengths, permitting connection of an electric current to the electrode as by breaking away a portion of the flux, or requires special feeding apparatus which will penetrate the flux coating to conduct current to the interior wire.

It is, therefore, an object of my invention to provide a source of flux supply independent of the electrode which may be fed to the electrode at the time the same is brought into the welding action.

Another object of my invention is to provide a device of the character described in the preceding paragraph wherein the particular kind of flux and the particular kind of electrode may be independently selected and brought together at the welding machine.

Another object of the invention is to provide a method of supplying flux to an electrode in the form of a flux impregnated tape.

Another object of the invention is to provide a device for combining the flux and the electrode metal immediately prior to feeding the same into the arc.

Other objects of my invention will be apparent from a study of the following specifications read in connection with the accompanying drawing, wherein Fig. 1 is a diagrammatic view of an automatic electric arc welding machine provided with electrode wire feeding mechanism and flux supplying mechanism constructed in accordance with my invention;

Fig. 2 is an enlarged detail diagrammatic view, illustrating the method of supplying the flux to the electrode wire;

Fig. 3 is a detail view of one of the rollers employed in the feeding of the flux to the electrode;

Fig. 4 is a sectional view, taken along line IV—IV of Fig. 2, illustrating the first step of wrapping the flux material around the electrode wire; and Fig. 5 is a detail, sectional view taken along line V—V, illustrating a further step in the wrapping of flux tape around the electrode.

Referring to the drawing, I have illustrated, in Fig. 1, a portion of an automatic electric arc welding head 1, as comprising a suitable support 2 upon which is mounted a bracket 3 to support a spool or reel 4 containing a continuous length of electrode metal wire 5. The electrode wire 5 is adapted to be drawn from the reel 4, as by means of passing the wire between a pair of feed rollers 6 which may be driven in any well known manner employed in electric arc welding. Immediately below the feed rollers 6, I have illustrated a friction clamp 7, through which the electrode wire 5 is adapted to slide, the clamp being connected to a suitable source of electric power employed for supplying the welding current, so that as the electrode wire 5 is fed through the clamp electric current will be conducted to the wire.

The flux which is to be employed is illustrated as comprising the form of a continuous length of tape 8 formed of any suitable material, such as a fabric which has been impregnated with the desired chemical compounds forming the particular flux desired in any particular instance. The flux tape is illustrated as being wound upon a suitable spool 9 supported upon a suitable bracket 10 so that the tape 8 may be fed therefrom over a guide roller 11 to a position adjacent the descending electrode wire 5. The tape 8 is illustrated as continuing beyond the guide roller 11 to a wrapping roller 12, which is provided with a suitable circumferential groove 13 which may partially surround the electrode wire 5 and thus wrap the tape about the wire 5, as is illustrated particularly in Fig. 4. The electrode wire is pressed into the groove 13, as by means of a pressing roller 14. Thus the flux material is partially wrapped around the electrode wire with this operation and as the tape continues downwardly around the electrode wire, a second pair of rollers 15 and 16 are provided bearing complementary annular grooves 17 and 18, respectively, to further wrap the flux into close engagement with the wire 5. The pressure which is exerted by the rollers 13, 14, 15 and 16 may be such as to securely press the flux into engagement with the tape with sufficient force to maintain the tape in engagement with the wire, or suitable binding ingredients may be provided in the flux material, or may be added to the flux tape to constitute an adhesive which will hold the flux material upon the wire after its passage through the rollers 15 and 16.

The operation of my device is as follows:

The electrode wire 5 may be drawn over the reel 4 between feed rollers 6 and through the contact clamp 7 to a position immediately above the rollers 12 and 14. The tape 8 may be drawn from its spool 9 over the guide roller 11 and placed around the electrode wire 5 after which the electrode wire and the tape may then be passed through the space between the rollers 12 and 14 to insure the continued wrapping of the tape and wire as the two are simultaneously fed downwardly. Then the partially wrapped tape and wire may be passed between the rollers 15 and 16 to continue the wrapping, after which the wire, now covered with the tape, may be drawn downwardly into a position immediately above the work piece 19 which is to be welded.

Then, upon striking the arc to begin the welding operation, the continued feeding of the wire 5 by means of its rollers 6, will cause the wire to be passed continuously through the rollers 12—14 and 15—16, thereby drawing the tape 8 continuously from its spool 9 to cause the electrode wire 5 to be presented to the arc with its wrapping of flux.

The particular electrode wire metal may be selected for the particular job which is desired to be welded; for example, the wire composition may be selected to conform with the composition of the iron, steel or other material to be welded.

At the same time, the flux which is desired for the particular metal to be welded, for the particular speed of welding which is desired, for the particular penetration of the weld which is desired, and for other various conditions, may be suitably selected to conform with these conditions independent of the particular selection of the electrode metal and may be supplied to the reel. Moreover, it will be observed that the flux coating which is placed around the wire by my method does not in any way interfere with the transmission of electric current to the electrode wire so that my flux feeding device may be added to already existing electrode feeding devices without interfering in any way with the operation of these devices.

While I have illustrated and described the preferred embodiment of my invention, it is to be understood that I do not desire to be limited to any of the details shown or described herein, except as defined in the appended claims.

I claim:

1. The method of automatic electric arc welding which consists in feeding a continuous length of electrode wire to an arc struck between the wire and the material to be welded, supplying electric current to the wire at a point removed from the arc, feeding a flux in the form of a flat tape to the wire and parallel therealong at a point between the arc and the point of supplying current to the electrode wire, and deforming said flux tape about said electrode wire to substantially completely enclose the latter.

2. In a device for electric arc welding which utilizes as one electrode a length of electrode metal in the form of a wire to be fed into the arc struck between the electrode metal and the material to be welded, means for feeding said wire into said arc, means contacting said wire to supply electric current thereto, means for feeding a flux in the form of a flat tape to said wire and parallel therealong, and means for laterally deforming said tape about said wire.

3. In a device for electric arc welding which utilizes as one electrode a length of electrode metal in the form of a wire to be fed into the arc struck between the electrode metal and the material to be welded, means for feeding said wire into said arc, means contacting said wire to supply current thereto, means for feeding a flux in the form of a flat tape to said wire and parallel therealong, means for folding the edges of said tape back about said wire to form a trough containing said wire, and additional means positioned between said first folding means and said arc for compressing said folded tape against said wire to substantially completely enclose the latter.

4. In a device for electric arc welding which utilizes as one electrode a length of electrode metal in the form of a wire to be fed into the arc struck between the electrode metal and the material to be welded, means for feeding said wire into said arc, means contacting said wire to supply electric current thereto, means for feeding a flux in the form of a flat tape to said wire and parallel therealong, means comprising a grooved roller and a cooperating tongued roller for laterally deforming said tape into a trough with said wire in the bottom thereof, and a second pair of grooved rollers positioned between the said first pair of rollers and said arc and having their axes displaced from parallel relation with respect to the axes of said first rollers for compressing the side walls of said trough completely about said wire.

LESLIE E. AUGUST.